United States Patent [19]

Lair

[11] Patent Number: 5,419,515
[45] Date of Patent: May 30, 1995

[54] THRUST REVERSER FOR JET ENGINES

[75] Inventor: Jean-Pierre Lair, San Antonio, Tex.

[73] Assignee: Aeronautical Concept of Exhaust, Ltd., San Antonio, Tex.

[21] Appl. No.: 1,129

[22] Filed: Jan. 4, 1993

Related U.S. Application Data

[63] Continuation-in-part of Ser. No. 798,213, Nov. 26, 1991, Pat. No. 5,176,340, and a continuation-in-part of Ser. No. 817,278, Jan. 6, 1992, Pat. No. 5,181,676.

[51] Int. Cl.$^6$ .............................................. F02K 1/62
[52] U.S. Cl. ......................... 244/110 B; 239/265.37; 60/230
[58] Field of Search ................... 244/110 B, 23 D; 239/265.19, 265.33, 265.37; 60/230, 226.2

[56] References Cited

U.S. PATENT DOCUMENTS

| | | | |
|---|---|---|---|
| 2,735,264 | 2/1956 | Sewett | 244/110 B |
| 3,601,992 | 8/1970 | Maison | 239/265.19 |
| 3,612,399 | 10/1971 | Rodgers et al. | 239/265.37 |
| 3,837,579 | 9/1974 | Camboulives et al. | 239/265.37 |
| 4,030,687 | 6/1977 | Hapke | 239/265.19 |
| 4,182,501 | 1/1980 | Fage | 244/110 B |
| 4,618,094 | 10/1986 | Palmer | 239/265.37 |

FOREIGN PATENT DOCUMENTS

| | | | |
|---|---|---|---|
| 261487 | 6/1960 | Australia | 244/110 B |
| 182858 | 3/1963 | Sweden | 244/110 B |

Primary Examiner—Galen L. Barefoot
Attorney, Agent, or Firm—Harold H. Dutton, Jr.

[57] ABSTRACT

A thrust reverser for use with a jet engine comprising a pair of symmetrical thrust reverser door, each of the doors being pivotally attached to the jet engine so as to be pivotally movable between reversing and non-reversing positions, each of the doors having a scarfed trailing edge portion so that in the reversing position, the trailing edge portions of the doors are in abutting contact, the thrust reverser doors comprising an inner skin and an outer skin, with the inner skins forming a portion of the jet flow boundary extending from said jet engine pipe to the trailing edge of the door, a pair of half-shells, one being associated with and surrounding the trailing edge portion of each of the doors, the half-shells each comprising inner and outer skins and the inner skin of the half-shells forming the jet flow boundary from the trailing edge of the doors to the exhaust outlet.

13 Claims, 5 Drawing Sheets

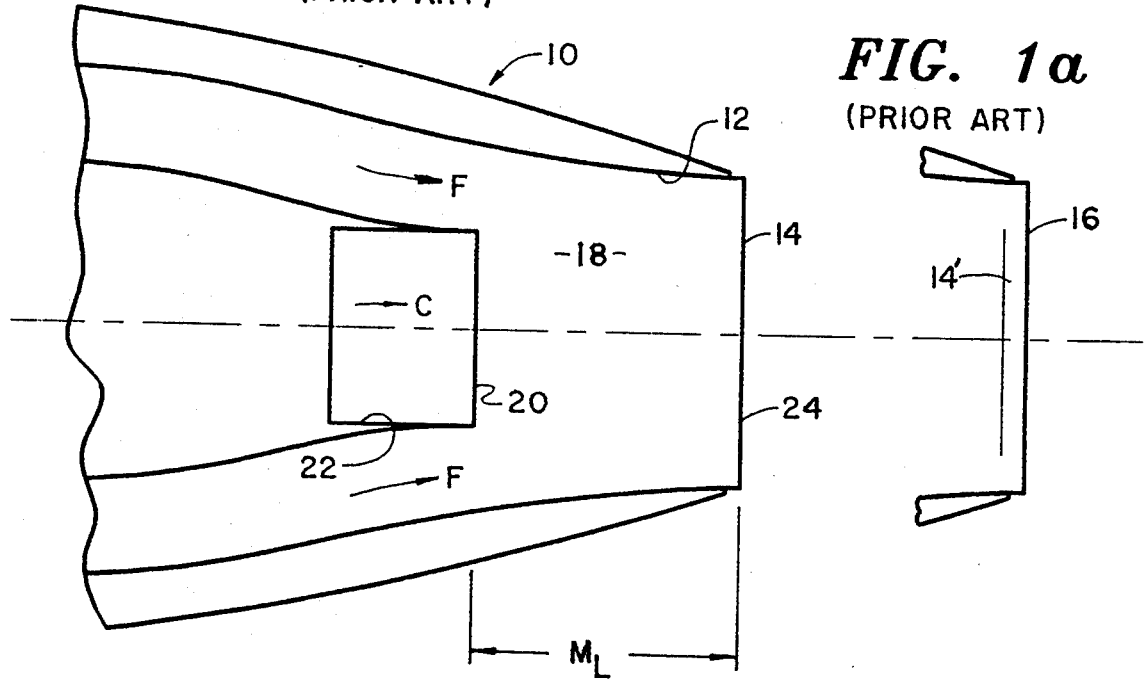
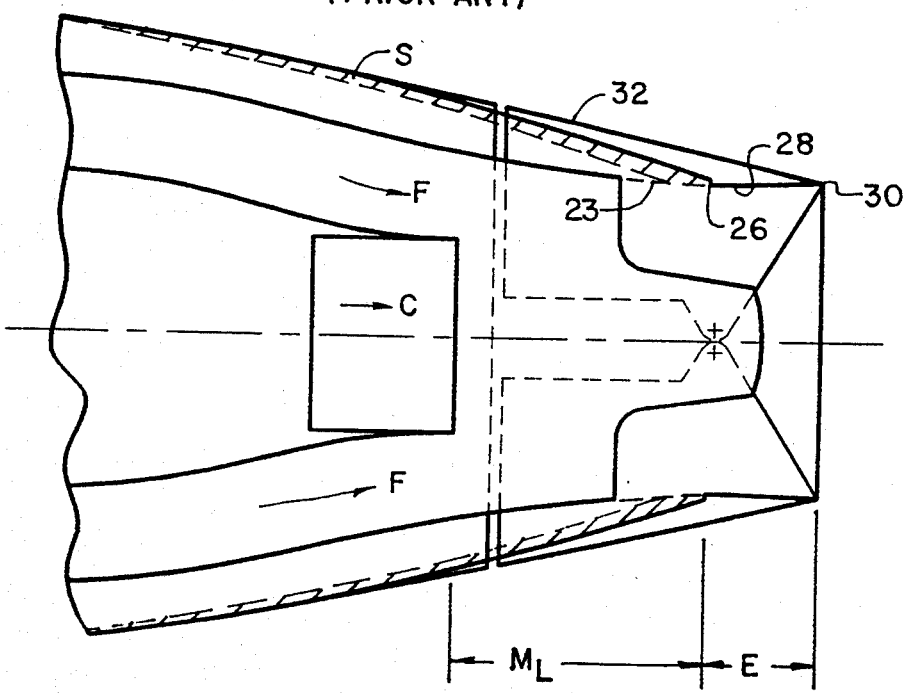

FIG. 3
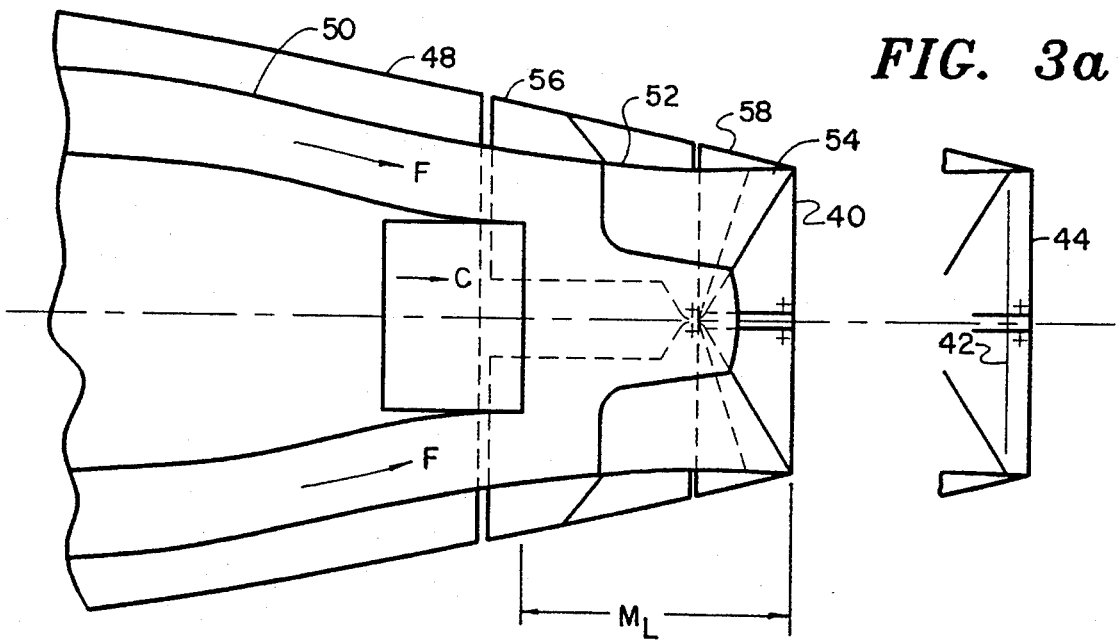
FIG. 3a
FIG. 6
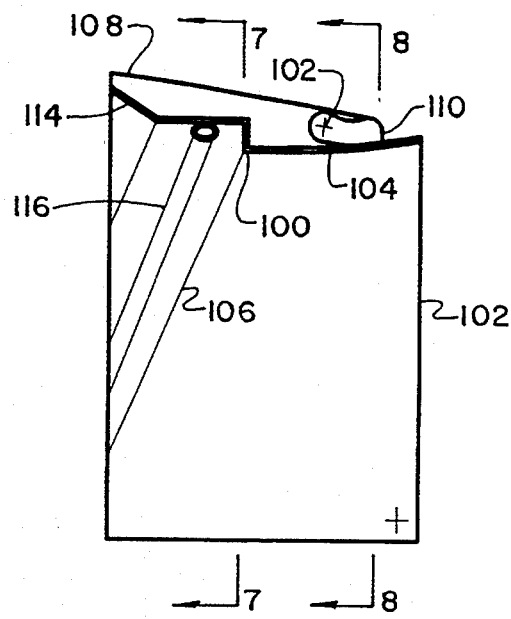

THRUST REVERSER FOR JET ENGINES

CROSS-REFERENCE TO RELATED APPLICATIONS

This application is a continuation-in-part of my application Ser. No. 07/798,213 filed Nov. 26, 1991, now U.S. Pat. No. 5,176,340 issued Jan. 5, 1993. This application is also a continuation-in-part of my application Ser. No. 07/817,278 filed Jan. 6, 1992, now U.S. Pat. No. 5,181,676 dated Jan. 26, 1993. The specification of said applications are incorporated herein by reference.

This invention relates to a thrust reverser for jet engines, and in particular, aircraft engines. More particularly, this invention relates to an improved thrust reverser which can be used with or without by-pass of the main jet, and which is disposed downstream of the jet exhaust pipe, and which does not degrade engine performance upon installation.

BACKGROUND AND OBJECTS OF THE INVENTION

In order to reduce the landing distance of a jet engine powered aircraft, as well as to increase the margin of safety when the aircraft is landing on a wet or icy runway, thrust reversers are utilized on the jet engines in order to provide a braking thrust for the aircraft. Such thrust reversers function to reverse the direction of the jet thrust, from a normally rearward direction used for propelling the craft, to a forward direction for slowing or braking the craft.

Typically the thrust reversers are formed by thrust reverser "doors" are hingedly mounted on a fixed structure called a jet pipe, and usually form the final nozzle of the gas turbine engine. The doors are capable of pivoting between two positions about an axis which is transverse and substantially diametrical with respect to the jet of the engine.

The first position finds the doors in a stowed position, out of the direct path of the exhaust blast of the engine. In this position, the doors form the exhaust nozzle of the gas turbine engine so that the thrust of the engine is directly rearward, thereby producing the forward thrust of the aircraft. In the second position, the doors are pivoted about the pivot axis to a transverse, blast deflecting or deployed position, to intercept and redirect the jet blast and produce the braking thrust for the aircraft when needed. In order to allow such pivotal movement in prior art thrust reversers, the trailing edge of the reverser doors must be fully scarfed to enable the pivotal deployment and the butting of the trailing edges of the two doors against one another in the deployed position. This scarfing produces what is known as a "fishmouth" shape at the exhaust outlet because of its appearance when viewed from the side. Such a "fishmouth" opening is technically considered as non-planar.

Experience has shown that this shape rather significantly degrades the engine performance in a forward thrust mode of operation, and this degradation is caused by two combined factors. Firstly, there is a rather significant loss of nozzle efficiency because of efflux spillage sideways through the cut away portions created by the scarfs. Secondly, there is a significant thickness of the trailing edge of the reverser doors, leading to an excessive base area, in turn leading to a non-negligible base drag.

In addition, the thrust reversers according to the prior art patents significantly change the inner flow lines of the jet stream through the engine, since the throat of the nozzle is (and must be) located upstream of the trailing edge of the reverser nozzle. Also, from the throat to the trailing edge of the reverser, the inner skin of the door has a cylindrical or divergent extension. Irrespective of the fishmouth exit, or the cut away portions created by the scarfs (which significantly degrade the engine nozzle performance), the structure extending aft of the throat of the nozzle increases the nozzle discharge coefficient at all engine pressure ratios. This in turn modifies the engine operating characteristics. Therefor, with this type of thrust reverser nozzle, it is necessary to modify the basic aircraft performance manual.

The prior art demonstrates some variable area exhaust nozzles for thrust reversers, and such devices are shown in U.S. Pat. No. 4,966,327 and French Patent 2,614,939. Theoretically, a variable area exhaust provides certain benefits for the jet engines, in enabling them to adapt to different conditions of the flight. For example, since different characteristics of the engines are desirable for take off, climb and cruise modes of operation, and varying the exhaust area enables the engine to better achieve the optimum characteristics.

According to the prior patents mentioned above which integrate a variable exhaust area nozzle with the thrust reverser, the thrust reverser doors do not (and cannot) in any of the controllable positions of the reverser doors define the throat of the exhaust nozzle to be at the trailing edge of the nozzle/reverser doors. In these prior patents, the inner flow line of the thrust reverser doors is convergent toward the throat, with a cylindrical extension aft of the throat. This means that at any position of the thrust reverser nozzle, the throat of the nozzle always remains significantly upstream of the reverser nozzle trailing edge. This is an inherent characteristic in the design of the prior art as it is described in French patent 2,382,594.

In the case of the prior art thrust reversers using the scarfed or fishmouth nozzles, another drawback arises in that the performance characteristics of the engine are somewhat degraded such that varying the exhaust area merely helps to recapture the efficiency lost to the scarfing. This degradation of performance is caused by a not-insignificant lateral efflux of exhaust gas in the area of the fishmouth cutouts.

In U.S. Pat. Nos. 4,194,692 and 4,093,122, the thrust reverser doors are incapable of defining, in any of their controllable positions, the throat area of the nozzle. By the term "throat" as it is commonly used in this field is meant the point or location of the minimum cross-sectional area of the engine's ejection nozzle. In both of these prior patents, the throat area of the nozzle is not adjusted by the thrust reverser doors, but rather by a separate variable convergent nozzle.

In addition, the fishmouth cutouts of prior art thrust reversers necessarily affect the configuration of the exhaust nozzle of the engine upon which they are installed, even when in the stowed position. For example, the exhaust nozzle cannot be a strictly convergent nozzle, which is desirable for better cruise performance. In the prior art, the throat of the nozzle is necessarily at the boundary of the convergent portion and of the cylindrical or divergent fishmouth extension, i.e. upstream of the fishmouth exit. This changes the engine operating characteristics in comparison to a basic, non-reversing engine nozzle.

Accordingly, a primary object of the present invention is to provide an improved thrust reverser for jet aircraft engines.

Another object of the invention is to provide a thrust reverser which does not interfere with normal engine operating characteristics.

Still another object of the invention is to provide a thrust reverser which does not affect the jet flow lines of the engine.

Yet a further object of the invention is to provide an improved thrust reverser in which when in the stowed position, the inner skin of the thrust reverser doors and the half shells form the flow boundary of the jet of the engine.

DESCRIPTION OF THE INVENTION

According to the present invention, the thrust reverser is disposed downstream of the jet exhaust pipe and is formed by two symmetrical thrust reverser doors, each of which is mounted to pivot around an axis which is transverse and substantially diametrical with respect to the jet of the engine on opposite sides of the jet engine pipe, and two shells, more precisely half-shells, installed downstream of the thrust reverser doors and capable of pivoting around an axis which is transverse and substantially diametrical with respect to the jet of the engine.

The thrust reverser doors and the half shells are constructed and adapted to occupy two positions: a first, folded or stowed position in which the inner skin of the thrust reverser doors defines the inner flow profile of the jet engine (main jet plus by-pass, or main jet only if there is no bypass), and in which the thrust reverser door outer skin and the half shell outer skin define the rear portion of the outer flow profile of the nacelle housing the engine; and a second, unfolded or deployed position in which the thrust reverser doors are disposed transversely to the jet while the two half shells have moved downstream, behind the thrust reverser doors and out of the exhaust flow.

When the thrust reverser doors are in the folded or stowed position, the inner skin of the doors and of the two half shells form the flow boundary of the jet of the engine. The flow boundary profile can be either strictly convergent, with a planar exhaust exit, whereby the throat is defined by the two half shells and located at the trailing edge of the half shells, or can be convergent-divergent, again with a planar exhaust exit, with the throat still being defined by the two half-shells but located slightly upstream of the planar exit of the half shells.

According to this invention, the jet flow lines are not affected by the thrust reverser installation. The flow profile can be identical to that of the basic, non-reversing reference nozzle, i.e. strictly convergent with the throat at the trailing edge, and with the exit being planar (no fishmouth), Alternatively, the nozzle can incorporate a divergent exit, still with a planar exit.

DESCRIPTION OF THE DRAWINGS

The invention will be described in greater detail with reference to the accompanying drawings which show by way of non-limiting example, the preferred features and embodiments of the invention, and in which:

FIG. 1 is a longitudinal cross-sectional view of a non-reversing reference nozzle, with a strictly convergent profile;

FIG. 1-a is a fragmentary cross-sectional view of the exit of the reference non-reversing nozzle of FIG. 1, but integrating a convergent-divergent configuration;

FIG. 2 is a longitudinal cross-sectional view of a known thrust reverser in the folded position;

FIG. 3 is a longitudinal cross-sectional view of a thrust reverser according to the present invention, and having a strictly convergent configuration;

FIG. 3-a is a longitudinal cross-sectional view of the exit of a thrust reverser according to the present invention, and having a convergent-divergent configuration;

FIG. 6 is a longitudinal cross-sectional view on a slightly larger scale of one of the half-shells;

DETAILED DESCRIPTION OF PREFERRED EMBODIMENTS

Figure 4:
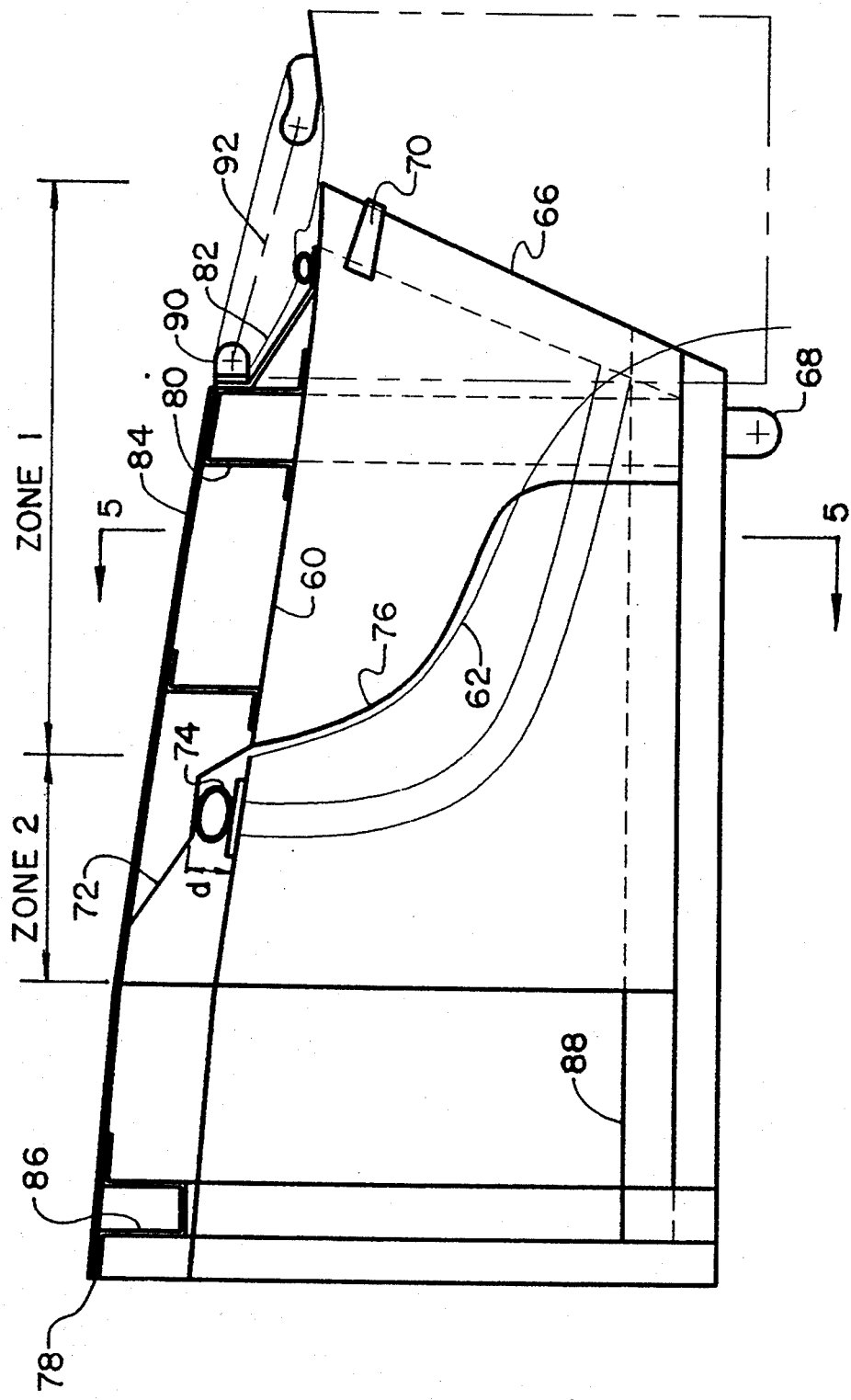
FIG. 4 is a longitudinal cross-sectional view of a thrust reverser door according to the present invention.
Figure 5:
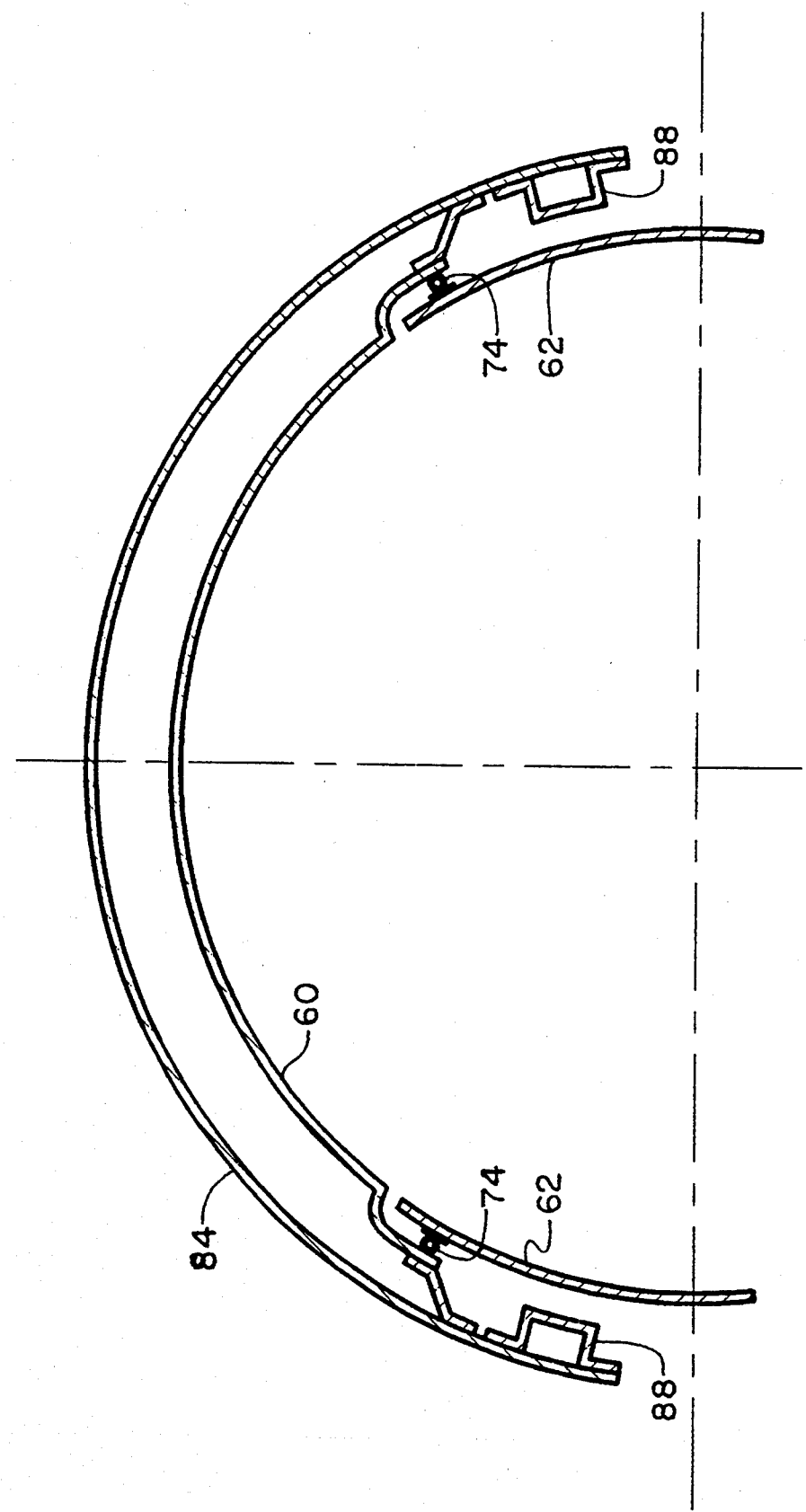
FIG. 5 is a transverse sectional view along lines 5—5 of FIG. 4 and viewed in the direction of the arrows.

Referring to FIG. 1 showing a basic reference nozzle in cross-section, the rear portion of the nacelle houses the jet engine. The drawing shows a double flow (core flow C plus fan flow F) engine 10, but the same principles would be valid for a single (core) flow engine. It is important to note that the inner skin profile 12 which defines the jet stream boundary is either strictly convergent, with the throat 14 being at the planar exit as seen in FIG. 1, or incorporates a small convergent-divergent configuration as seen in FIG. 1-a. In this latter case, the throat 14' is slightly upstream of the exit 16, which is still planar.

It is also important to note that the zone 18, which is the zone where both the fan flow and the core flow mix, has a determined length $M_L$, called the mixing length, usually defined by the engine manufacturer. This dimension, which is the distance between the exit plane 20 of the primary nozzle 22 and the exit plane 24 of the exhaust nozzle, is one of the key parameters which needs to be respected to ensure proper engine performance.

FIG. 2 shows the rear portion of the nacelle having a thrust reverser installed in the manner defined in the prior art, in particular French patent 2,348,371 and U.S. Pat. No. 4,129,269. As can be seen, the rear portion of the thrust reverser forms the exit for the jet exhaust stream. The throat 26 is at the same station as in FIG. 1, so that the mixing length $M_L$ is the same as for the reference nozzle (FIG. 1). Downstream of the throat 26, the inner skin of the thrust reverser door has a cylindrical or divergent extension 28 extending to the trailing edge 30 of the reverser doors. This trailing edge is formed by the junction of both the arcuate inner lining and the outer skin 32, and is fully scarfed, creating the fishmouth appearance seen in FIG. 2, in order to allow abutment of the trailing edges of the reverser doors when they are commanded to deploy.

As seen by comparing FIGS. 1 and 2, the installation of the prior art thrust reverser lengthens the nacelle by an amount E equal to the cylindrical extension 28 aft of the throat 26, and also significantly increases the cross-section of the outer contour with respect to the non-reversing nacelle, as indicated by the shaded area S. The shaded area S represents the increased size of the outer profile over the reference nozzle. The implication of this increased size is greater weight.

It is also important to note with respect to FIG. 2, as documented by the two patents mentioned above, that the thrust reverser is of single skin configuration. The thrust reverser skin is defined by the outer skin and an arcuate lining having two faces, having an approximately V-shaped cross-section with the forward face covering less than half of the concave face. This means that between the exit plane of the jet pipe and the throat of the exhaust nozzle there is a free stream boundary layer 23 as it is described in the French patents 2,348,371 and 2,382,594, and U.S. Pat. Nos. 4,129,269 and 4,182,501.

FIG. 3 shows the improvements according to the present invention with respect to the prior art. Just as in the case of the reference nozzle without a thrust reverser in FIG. 1, the exit 40 is planar, whether the profile of the jet pipe is strictly convergent (as shown in FIG. 3) or convergent/divergent (as in FIG. 3-a). The throat and the exit are in the same plane if the profile of the boundary of the jet formed by the inner skin of the half-shells is strictly convergent. If the inner skins of the half shells are of the convergent/divergent type (FIG. 3-a), then like the reference nozzle, the throat 42 is slightly upstream of the planar exit 44. Since the exit is planar when the thrust reverser is in the stowed configuration (unlike the case of the prior art) it is not necessary to extend the length of the nacelle 48 in order to install the thrust reverser. Therefor in the thrust reverser according to the present invention, the same internal flow line is maintained and is now formed by the jet pipe 50, the inner skins 52 of the reverser doors and the inner skin 54 of the half shells. In addition, the outer ambient air flow line is essentially the same as defined by the nacelle 48, the outer skin 56 of the thrust reverser doors, and the outer skin 58 of the half shells. Thus, in comparison to the reference nozzle, the engine operating characteristics are not affected by installation of the thrust reverser, and the overall drag of the nacelle incorporating the thrust reverser according to the invention is not changed. Further, the mixing length $M_L$ is unchanged. Therefore, the aircraft performances are not degraded by the thrust reverser installation, which factor represents a significant improvement over prior thrust reversers.

As discussed above, the structure of the thrust reverser is essentially composed of two doors and two shells. The inner skins of these doors ensure the continuity of the jet flow lines, while the inner skins of the shells form the exhaust nozzle and provide a planar exit for the jet flows, and also incorporate the throat of the nozzle.

With reference to FIG. 4, a more detailed view of the thrust reverser doors is shown. Each of the doors is comprised of two skins and stiffening members which link them together. The inner skin is divided into two zones which fulfill different functions. In Zone 1, the portion 60 of the inner skin which is substantially of a hemi-truncated shape, ensures the continuity of the jet flow profile from the trailing edge 62 of the jet pipe 64 (shown as a thin line as it is not part of the door) to the trailing edge 66 of the reverser door. According to the invention, the inner skin not only ensures that the flow continuity is strictly convergent, but also is the only skin which is scarfed to allow deployment of the door when it pivots about its hinge fittings 68. In their deployed position, the doors abut on their abutment fittings 70 (at least 2 per door) bolted on the convex side of the inner skin.

In zone 2, the forward part 72 of the inner skin wraps the structure of the jet pipe 64 at a distance "d" which allows the installation of a seal 74 on the jet pipe 64. Therefore, the forward portion 72 of the inner skin ensures air tightness with the fixed structure or jet pipe 64.

The leading edge 76 of the inner skin is flush with the trailing edge 62 of the jet pipe 64, so that good flow continuity is provided. Also, the inner skin, at 90° from the reverser centerline extends more than half of the distance separating the leading edge 78 from the rear stiffening member 80.

In order to provide a good structural capability for the rear portion of the inner skin (downstream of the stiffening member 80), a stiffening lining 82 is installed, one side of which is attached to the member 80, with the other side being attached to the inner skin. The abutment fittings 70 are also attached to the lining 82 which ensures proper distribution of the reversing loads when the reverser doors are deployed.

The outer skin 84 covers only a portion of the thrust reverser door. The outer skin 84 extends only from the leading edge of the reverser door to the rear member 80. This skin ensures the flow continuity of the outer profile of the nacelle up to the rear stiffening member 80. Another stiffening member 86 is installed at the forward part of the skin and connects to longitudinal side members 88 to ensure proper structural integrity of the reverser doors.

On its rear face, member 80 attaches the hinge fitting 90 which supports one end of the linkage member 92 which controls pivoting of the half shell forming the exhaust nozzle of the nacelle as discussed in my prior application Ser. No. 798,213.

With reference to FIG. 6, the structure of the half shell is shown, The half shells ensure the function of the exhaust nozzle. They incorporate the throat 100 of the nozzle and provide a planar exit 102 as in a non-reversing nozzle. FIG. 6 shows a convergent/divergent profile, but the same structural arrangement would be used if the inner skin of the half shell had a strictly convergent profile, except that the throat and the exit would be in the same plane. As mentioned earlier, the inner skin 104 provides a continuity of the boundary for the jet of the engine. It overlaps slightly the rear portion of the reverser door inner skin, in the area of its trailing edge.

As shown in FIG. 6, the leading edge 106 of the inner skin 104 of the half shell is scarfed substantially by a plane which is parallel to the plane containing the trailing edge 66 of the reverser door inner skin.

The outer skin 108 provides a continuity of the outer flow line of the nacelle. It provides the continuity of the outer skin 84 of the thrust reverser door. Skins 104 and 108 are joined by a closing member 110. The exit plane 102 of the shell formed by the inner and outer skins is planar, a significant feature of this invention. Also, since as explained earlier the profile of the inner skin is of the convergent/divergent type, the throat 100 defined by the half shell is located slightly upstream of the exit 102. Skins 104 and 108 and closing member 110 provide the attachment point 112 for the hinge point of the second extremity of the link 92.

On their leading edge, skins 104 and 108 are joined by a closing wall 114 in order to impart to the half shells a good structural integrity. For insuring air tightness between the half-shell and the rear portion of the inner skin of the thrust reverser door, a seal 116 is installed substantially radially on the closing wall 114. The installation is obviously not limited to this particular arrangement, as the seal can also be attached in its substantially radial portion to the thrust reverser inner skin. Although a bulb type seal is shown in the drawings, other types of seals can be used.

Figure 7:
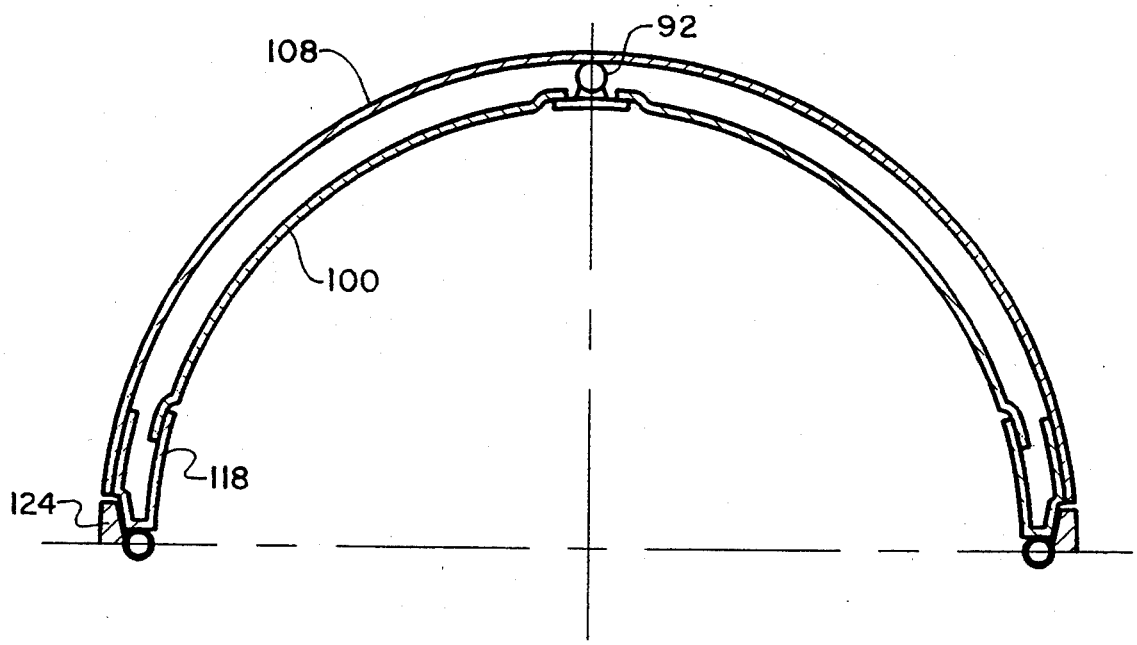
FIG. 7 is a transverse sectional view along lines 7—7 of FIG. 6 and viewed in the direction of the arrows.
Figure 8:
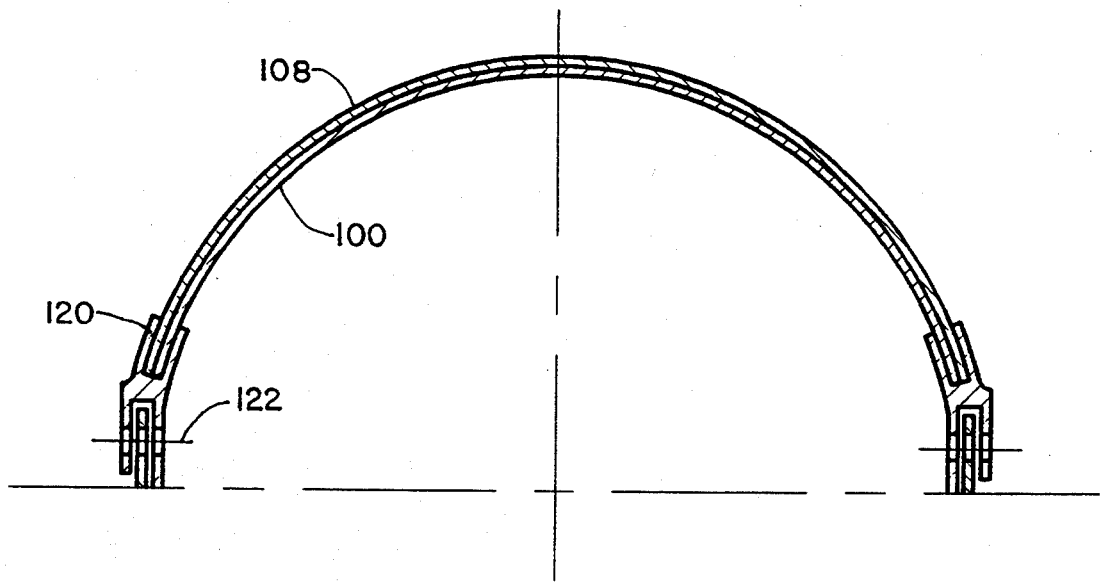
FIG. 8 is a transverse sectional view along lines 8—8 of FIG. 6 and viewed in the direction of the arrows.

Along their longitudinal edge, skins 104 and 108 are joined by a closing stiffening member 118 (FIG. 7) which in its aft end incorporates the hinge fitting 120 so that during the deployment of the reverser door, the half shell can rotate around its pivot axis 122. It is this stiffening member 118 and the corresponding stiffening member on the opposite side which ensures air tightness with the seal 116 installed on the supporting member 124 of the pivoting axis 122 and 112 of the thrust reverser doors and the half shells, respectively.

While this invention has been described as having certain preferred features and embodiments, it will be understood that it is capable of still further variation and modification without departing from the spirit of the invention, and this application is intended to cover any and all variations, modifications, embodiments and adaptations of the invention which fall within the spirit of the invention and the scope of the appended claims.

I claim:

1. A thrust reverser for use with a jet engine comprising a pair of symmetrical thrust reverser door members, each of said door members being pivotally attached to the jet engine so as to be pivotally movable between reversing and non-reversing positions, each of said door members having a scarfed trailing edge portion so that in said reversing position, the trailing edge portions of said door members are in abutting contact, each of said thrust reverser doors comprising an inner skin and an outer skin, said inner skins forming a portion of the jet flow boundary extending from said jet engine pipe to the trailing edge of said door, a pair of half-shells, one being associated with and surrounding the trailing edge portion of each of said door members, said half-shells each comprising inner and outer skins and the inner skin of said half-shell forming the jet flow boundary from said trailing edge to said exhaust outlet and defining the throat of the jet engine exhaust nozzle.

2. A thrust reverser for use with a jet engine comprising a pair of symmetrical thrust reverser door members, each of said door members being pivotally attached to the jet engine so as to be pivotally movable between reversing and non-reversing positions, each of said door members having a scarfed trailing edge portion so that in said reversing position, the trailing edge portions of said door members are in abutting contact, a pair of pivotally mounted half-shells forming an exhaust outlet for the engine in said non-reversing position, one of said half-shells being pivotally attached to and surrounding the trailing edge portion of each of said door members, said half-shells each comprising inner and outer skins and the inner skin of said half-shell forming the jet flow boundary from said trailing edge portion to said exhaust outlet in said non-reversing position, and said half-shells defining the throat of the exhaust outlet.

3. A thrust reverser as in claim 2 and wherein said half-shells define a planar exhaust outlet for the jet engine exhaust nozzle.

4. A thrust reverser as in claim 2 and wherein said half-shells define a strictly convergent jet flow for the jet engine exhaust nozzle.

5. A thrust reverser as in claim 2 and wherein the throat of the jet exhaust is located at the trailing edge of said half-shells.

6. A thrust reverser as in claim 2 and wherein said half-shells define a convergent-divergent jet flow for the jet engine exhaust nozzle.

7. A thrust reverser as in claim 2 and wherein each of said thrust reverser doors comprising an inner skin and an outer skin, said inner skins forming a portion of the jet flow boundary extending from said jet engine pipe to the trailing edge of said door.

8. A thrust reverser as in claim 7 and wherein said inner skin is scarfed to allow deployment of the thrust reverser door.

9. A thrust reverser as in claim 7 and wherein said half-shells define a planar exhaust outlet for the jet engine exhaust nozzle.

10. A thrust reverser as in claim 9 and wherein said half-shells define a strictly convergent jet flow for the jet engine exhaust nozzle.

11. A thrust reverser as in claim 7 and including a stiffening member extending along the lateral edges thereof.

12. A thrust reverser as in claim 7 and including seal means for establishing a gas tight seal between the inner skin of said thrust reverser doors and the jet pipe of the engine.

13. A thrust reverser as in claim 7 and including stiffening members positioned between said inner and outer skins of said thrust reverser doors.

* * * * *